US012394286B1

(12) United States Patent
Ramirez

(10) Patent No.: US 12,394,286 B1
(45) Date of Patent: Aug. 19, 2025

(54) ACCIDENT WARNING LIGHT

(71) Applicant: Jesus Ramirez, Cleburne, TX (US)

(72) Inventor: Jesus Ramirez, Cleburne, TX (US)

( * ) Notice: Subject to any disclaimer, the term of this patent is extended or adjusted under 35 U.S.C. 154(b) by 0 days.

(21) Appl. No.: 19/076,353

(22) Filed: Mar. 11, 2025

(51) Int. Cl.

| | |
|---|---|
| ***G08B 5/38*** | (2006.01) |
| ***F21S 8/08*** | (2006.01) |
| ***F21V 15/01*** | (2006.01) |
| ***F21V 21/02*** | (2006.01) |
| ***F21V 23/04*** | (2006.01) |
| ***G08B 25/01*** | (2006.01) |
| *F21W 111/02* | (2006.01) |
| *F21W 131/103* | (2006.01) |
| *F21Y 115/10* | (2016.01) |

(52) U.S. Cl.
CPC ................ *G08B 5/38* (2013.01); *F21S 8/088* (2013.01); *F21V 15/01* (2013.01); *F21V 21/02* (2013.01); *F21V 23/0407* (2013.01); *F21V 23/0442* (2013.01); *G08B 25/018* (2013.01); *F21W 2111/02* (2013.01); *F21W 2131/103* (2013.01); *F21Y 2115/10* (2016.08)

(58) Field of Classification Search
CPC ......... G08B 5/38; G08B 25/018; F21S 8/088; F21V 15/01; F21V 21/02; F21V 23/0407; F21V 23/0442; F21Y 2115/10; F21W 111/02; F21W 2131/103
USPC .......................................................... 340/331
See application file for complete search history.

(56) References Cited

U.S. PATENT DOCUMENTS

| | | | | |
|---|---|---|---|---|
| 4,042,919 | A * | 8/1977 | Patty | G08B 5/36 362/186 |
| 5,097,612 | A | 3/1992 | Williams | |
| 5,276,424 | A | 1/1994 | Hegemann | |
| 6,389,720 | B1 | 5/2002 | Hsieh | |
| 6,409,358 | B1 | 6/2002 | Grover | |
| 6,693,556 | B1 | 2/2004 | Jones et al. | |
| 7,985,004 | B1 * | 7/2011 | Schach | G08B 7/064 362/240 |
| 8,733,001 | B2 | 5/2014 | Gallet | |
| 2004/0183694 | A1 * | 9/2004 | Bauer | G08G 1/095 340/933 |
| 2006/0012487 | A1 * | 1/2006 | Gibson | G08G 1/095 340/815.45 |
| 2009/0045933 | A1 * | 2/2009 | Smith | F21S 43/15 340/468 |
| 2009/0289790 | A1 * | 11/2009 | Issokson | G08B 25/008 340/552 |
| 2010/0109898 | A1 * | 5/2010 | Kensy | H05B 45/20 340/815.73 |
| 2016/0071413 | A1 * | 3/2016 | Jones | G08G 1/0955 340/907 |
| 2017/0042003 | A1 * | 2/2017 | Logvinov | G05B 19/0428 |

* cited by examiner

*Primary Examiner* — Kerri L McNally
(74) *Attorney, Agent, or Firm* — James E. Walton

(57) ABSTRACT

An accident warning light includes a post assembly and a warning light assembly and is used to monitor a roadway for accidents. The post assembly is further comprised of a post base, a support post, and a post mount and is used to support the warning light assembly. The warning light assembly is further comprised of a top cap, an electrical slot, an angled lip, a strobe socket, a strobe bulb, a strobe lens, and at least one sensor. The divider further has at least one aperture to connect the warning light assembly to the post assembly.

19 Claims, 6 Drawing Sheets

ACCIDENT WARNING LIGHT

BACKGROUND

1. Field of the Invention

The present invention relates generally to warning and traffic control systems used on roadways, and more specifically to a system of using accident warning lights to alert drivers of any upcoming accidents or any other adverse driving condition.

2. Description of Related Art

When an accident occurs on a roadway, there is a chance that the initial accident will spread and involve additional drivers leading to a larger number of injuries or deaths. The chance of additional accidents occurring may also be further increased if there are already adverse driving conditions on the road such as poor visibility caused by the weather or if the roadways have blind spots caused by sharp turns or elevation changes. The speed that drivers are traveling at may also contribute to the increased chance of additional accidents occurring as most roadways allow drivers to drive at high speeds which makes sudden stops difficult and potentially dangerous. Typically, after an accident occurs, emergency services are dispatched to the scene of the accident to treat any injuries and direct traffic until the accident has been cleared away. However, it takes time for most emergency services personnel to arrive on scene and stop traffic, during which additional accidents may continue to occur. Even after emergency services arrive, the build up of traffic may still lead to more accidents depending on the road conditions if incoming drivers are not aware of the accident ahead and are unable to stop in time.

A need therefore exists for improvements in warning and traffic control systems. Although great strides have been made in traffic control systems, considerable shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
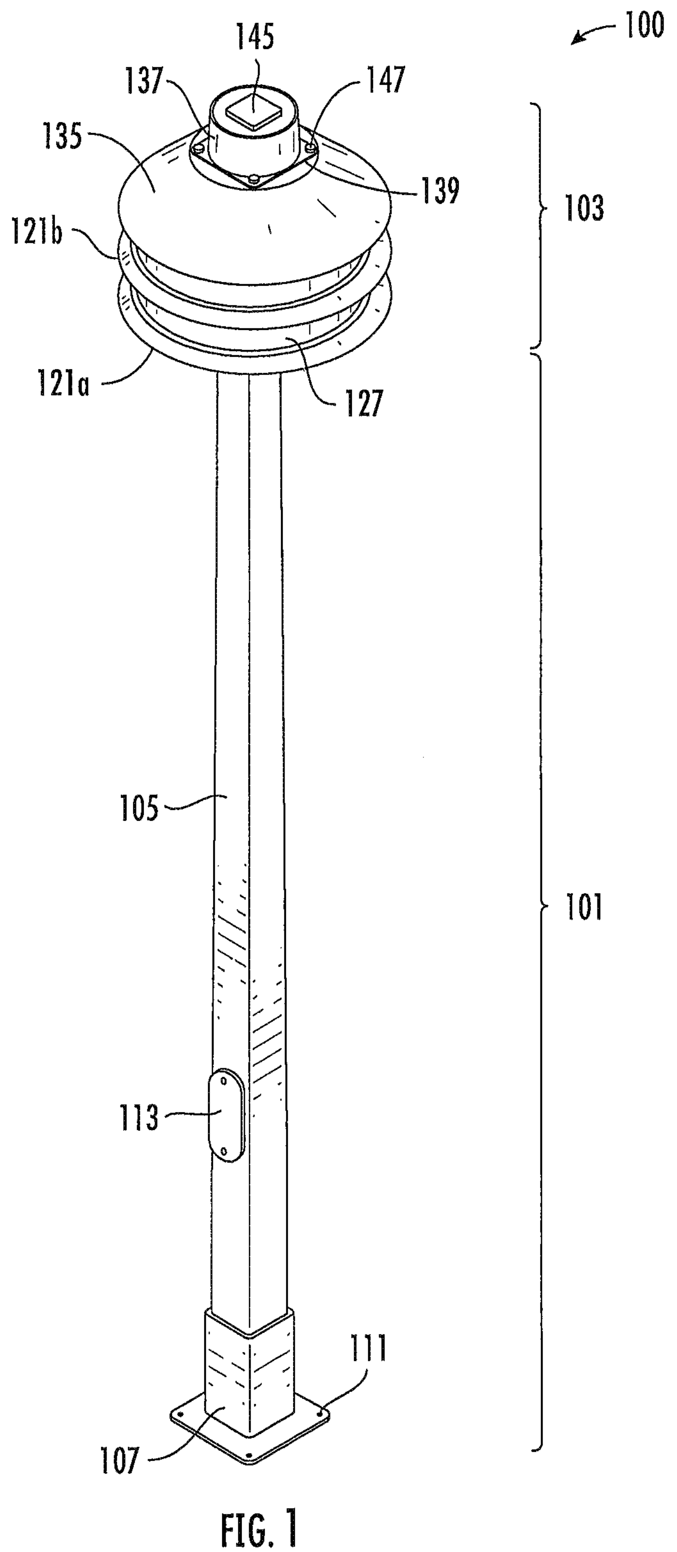
FIG. 1 is a perspective view of the accident warning light according to the preferred embodiment of the present application.

While the assembly of the accident warning light of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, combinations, and alternatives falling within the spirit and scope of the present application as defined by the appended claims.

DETAILED DESCRIPTION OF THE PREFERRED EMBODIMENT

Illustrative embodiments of the accident warning light are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. It is also appreciated that the use of "a" or "an" before a noun naming an object is construed to be that the noun refers to both the singular and the plural.

Figure 2:
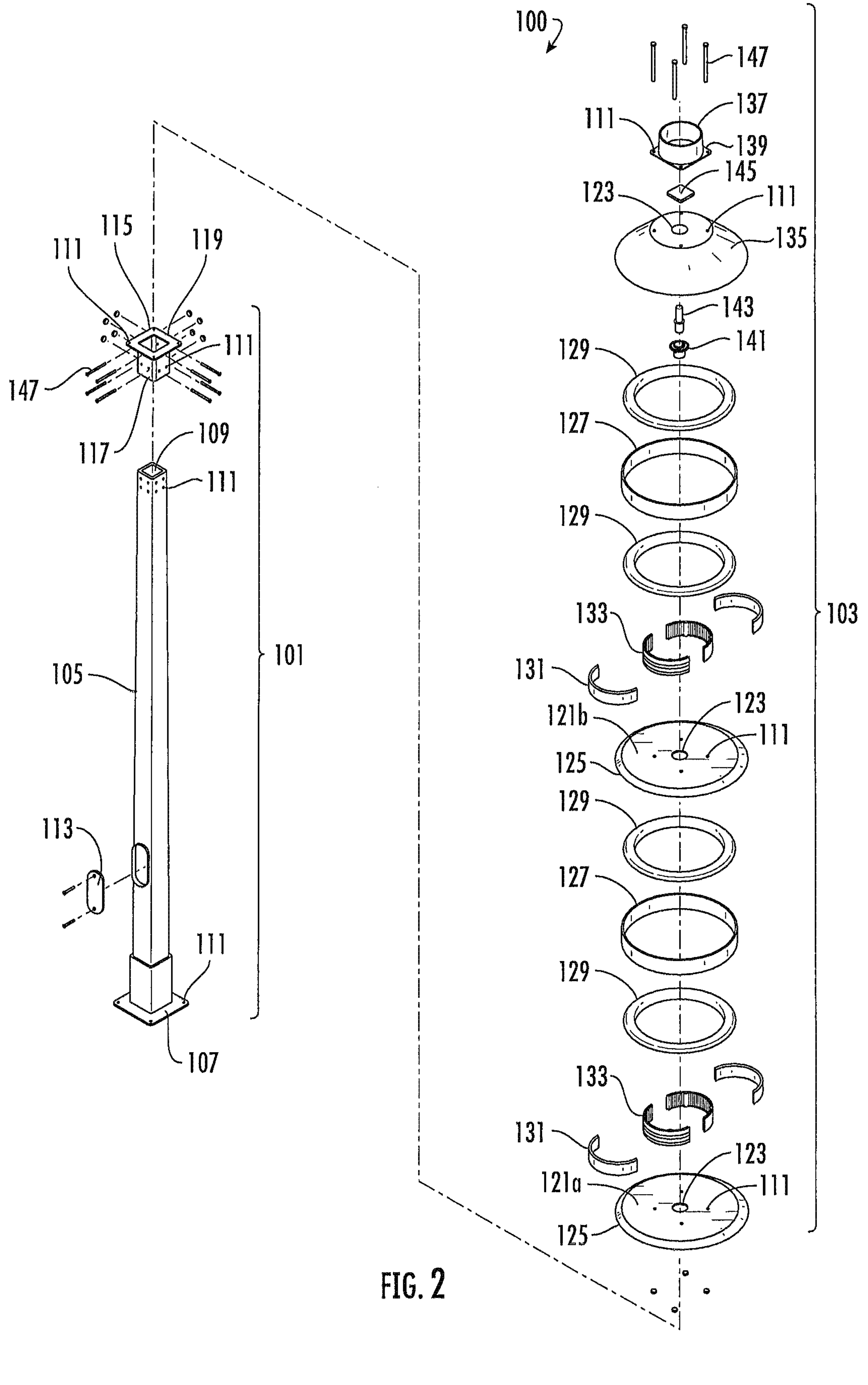
FIG. 2 is an exploded view of the accident warning light of FIG. 1.

Referring now to FIGS. 1 and 2 in the drawings, a perspective and an exploded view of accident warning light 100 according to the preferred embodiment of the present application is depicted. As shown in the drawings, accident warning light 100 is comprised of post assembly 101, warning light assembly 103, support post 105, post base 107, top opening 109, apertures 111, access panel 113, post mount 115, mount insert 117, mount base 119, dividers 121*a* and 121*b*, electrical slot 123, angled lip 125, lens 127, O-rings 129, LED panels 131, heat sinks 133, top cap 135, strobe lens 137, lens base 139, strobe socket 141, strobe bulb 143, sensor 145, and fasteners 147. In order to properly observe roadways for adverse driving conditions, accident warning lights 100 are preferably placed at designated intervals along the side of a roadway. Preferably, accident warning lights 100 are placed at consistent intervals to ensure that the entirety of the roadway is monitored, however, alternative embodiments may also exist where there may be greater distances between warning lights 100. In operation, accident warning lights 100 continuously monitor the flow of traffic to observe for any accidents which may occur or any other natural adverse driving conditions such as fog, flooding, ice, or any other adverse condition which could cause an accident. If an adverse driving condition or accident is detected, accident warning light 100 will automatically activate and begin flashing with lights to warn oncoming traffic. Accident warning lights 100 are preferably interconnected through a central server such that, if one warning light 100 detects adverse conditions, other warning lights 100 earlier along the road will also be sent a signal to activate to warn drivers about the adverse conditions ahead.

Figure 3:
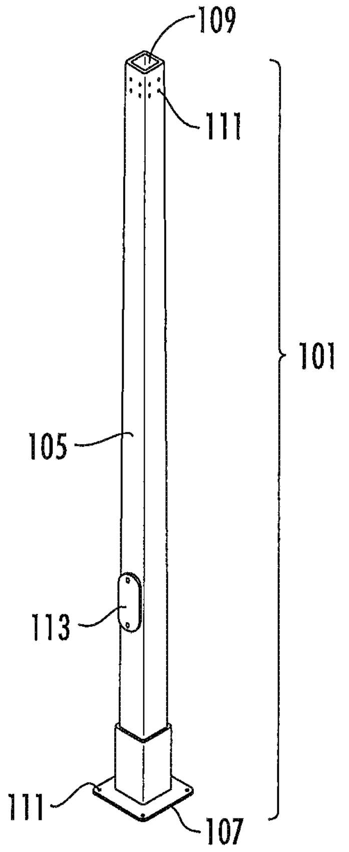
FIG. 3 is a perspective view of the post assembly from the accident warning light of FIG. 1.

Referring now also to FIG. 3 in the drawings, a perspective view of post assembly 101 of accident warning light 100 according to the preferred embodiment of the present application is depicted. Post assembly 101 is comprised of support post 105, post base 107, top opening 109, apertures

111, access panel 113, post mount 115, mount insert 117, and mounting base 119 and is used to support warning light assembly 103. The main length of post assembly 101 is formed by support post 105 which is generally square in shape, however, alternative embodiments may also exist where support post 105 is instead cylindrical, hexagonal, or any other shape. Support post 105 is preferably formed out of sturdy material capable of withstanding adverse weather conditions such as heavy winds and storms to prevent post assembly 101 from being knocked over. To secure post assembly 101 at a designated surface along the roadway, the bottom of support post 105 is positioned within post base 107 which is secured to the designated surface using fasteners 147.

Post base 107 is preferably square in shape and extends outwardly from support post 105 increasing the surface area that is in contact with the designated surface. While post base 107 is shown to have a square base in the present application, alternative embodiments may also exist where base 107 is circular, hexagonal, or any other shape, so long as base 107 has a significant surface area in contact with the designated surface. Post base 107 further a series of apertures 111 bored through the flat surface of base 107 to receive fasteners when securing accident warning light 100 to the designated surface. As accident warning light 100 is designed to monitor the flow of traffic on a roadway, the designated surface that warning light 100 is secured to is typically the side of the road where asphalt or concrete has already been poured. However, the designated surface may be any other stable surface adjacent to the road or the designated surface may be a surface poured specifically for supporting accident warning light 100.

As accident warning light 100 is used to alert drivers of accidents or other adverse driving conditions, it is preferred that support post 105 extend significantly upwards from post base 107 to ensure visibility for drivers. In the preferred embodiment, support post 105 extends upwards ten feet from post base 107 to ensure that most traffic will not block the view of accident warning light 100. However, alternative embodiments may also exist where support post 105 extends further than ten feet from post base 107 in situations where a taller accident warning light 100 is needed such as with elevated roadways or bridges or where support post 105 extends less than ten feet when a shorter warning light 100 is desired. It is appreciated that when taller support posts 105 are used, warning light assembly 103 may also be scaled up proportionally with the height of post 105 to ensure visibility. While not shown in the drawings, it is also appreciated that alternative embodiments may also exist where instead of support post 105 extending upwards, post 105 may instead extend downwards or sideways if accident warning light 100 is installed within a tunnel or other enclosed environment. As enclosed environments severely limit the visibility of the roadways ahead of drivers, having accident warning lights 100 within these environments help warn drivers of upcoming accidents or adverse traffic conditions that otherwise might not be visible. It is further appreciated that alternative embodiments may also exist where support post 105 does not extend outwardly at a 90 degree angle relative to post base 107 and may instead protrude at any angle.

As shown in FIG. 3 of the drawings, support post 105 is preferably hollow with a top opening 109 allowing for electrical components of accident warning light 100 to be stored within support post 105 and pulled up through opening 109 to connect to warning light assembly 103. During operation, accident warning light 100 may either receive electricity from an internal battery within support post 105 or accident warning light 100 may be connected to an external battery or power line. It is appreciated that if accident warning light 100 does receive electricity from an internal or external battery, warning light 100 may further be connected to solar panels for recharging the battery. Along with providing power to accident warning light 100, the electrical components within support post 105 are also used to carry activation signals between the many components of warning light assembly 103 and access panel 113. Access panel 113 is preferably positioned on the external surface of support post 105 and is connected to warning light assembly 103 through the internal electrical components allowing an individual to manually activate or deactivate warning light assembly 103 as needed. Being able to activate accident warning light 100 even if an accident is not detected would be beneficial during a parade or other large event which could cause significant traffic. To ensure that only the intended individuals be able to operate access panel 113, access panel 113 is preferably covered allowing only authorized individuals such as emergency services or individuals repairing accident warning light 100 to use access panel 113.

Figure 4:
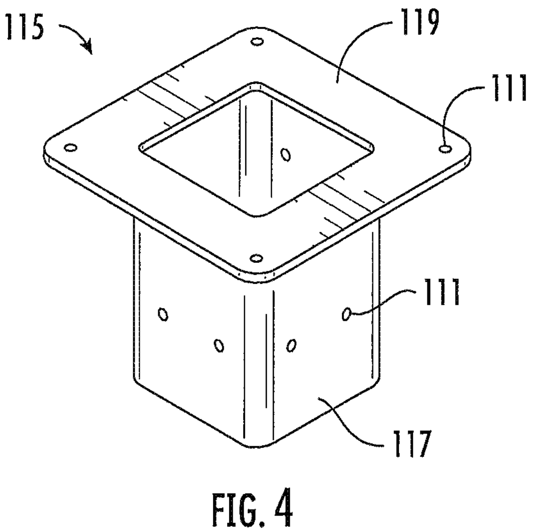
FIG. 4 is a perspective view of the post mount from the post assembly of FIG. 3.

Referring now to FIG. 4 in the drawings, a perspective view of post mount 115 of accident warning light 100 according to the preferred embodiment of the present application is depicted. Post mount 115 is comprised of mount insert 117 and mount base 119 and is used to secure warning light assembly 103 onto the top of post assembly 101. Mount insert 117 is preferably square in shape and sized to be slightly smaller than support post 105, such that mount insert 117 is securely received by top opening 109. It is also appreciated that the shape of mount insert 117 may also be circular, hexagonal, or any other shape to match the shape of support post 105. To retain mount insert 117 within support post 105, mount insert 117 has a series of apertures 111 bored through the surface of mount insert 117 matching the size and position of apertures 111 bored along the top of support post 105, such that fasteners 147 can be inserted through apertures 111 to secure insert 117 within the top of post 105. Once mount insert 117 is secured within support post 105, mount base 119 provides a surface for securing warning light assembly 103 onto post assembly 101. Mount base 119 is a preferably flat square surface extending outwardly along the top edges of mount insert 117 and has a series of apertures 111 positioned along base 119 for receiving fasteners 147 to secure warning light assembly 103 onto base 119. Like with post base 107, alternative embodiments may also exist where the shape of mount base 119 may be circular, hexagonal, or any other shape so long as there is a large enough surface area to receive warning light assembly 103.

Figure 5:
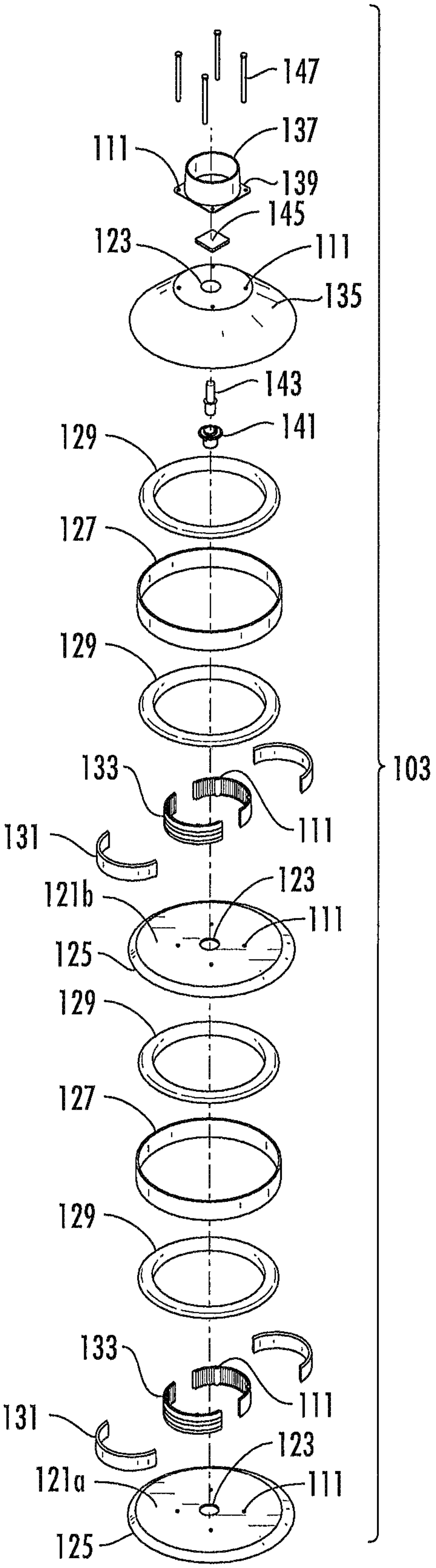
FIG. 5 is an exploded view of the warning light assembly from the accident warning light of FIG. 1.

Referring now also to FIG. 5 in the drawings, an exploded view of warning light assembly 103 according to the preferred embodiment of the present application is depicted. As shown in FIG. 5, warning light assembly 103 is comprised of dividers 121*a* and 121*b*, electrical slots 123, angled lip 125, lens 127, O-rings 129, LED panel 131, heat sinks 133, top cap 135, strobe lens 137, lens base 139, strobe socket 141, strobe bulb 143, and sensor 145. When assembling accident warning light 100, warning light assembly 103 is preferably positioned at the top of post assembly 101 to ensure visibility for drivers below. However, alternative embodiments may also exist where warning light assembly 103 may be positioned at the bottom of post assembly 101 to function as a fog light or where accident warning light 100 has an additional light positioned at the bottom of post 101 to function as a fog light. Alternative embodiments may also exist where instead of only having one singular warning light assembly 103, accident warning light 100 may have more than one light assembly 103 secured to post assembly 101. Whenever an accident is detected by warning light assembly 103, the lights within assembly 103 are activated and shine with designated colors to help manage the flow of traffic. As accident warning lights 100 are preferably interconnected, activation of one warning light 100 sends a signal through a central server to other warning lights 100 positioned earlier along the roadway to start alerting drivers of an upcoming accident or adverse conditions. It is also appreciated that along with contacting other accident warning lights 100, activation of warning light 100 may also send a signal to emergency services that an accident has occurred so that the emergency services can quicky arrive on scene. Accident warning lights 100 may further communicate with online map services to transfer information on where traffic is heavy or where accidents have occurred on the roadway.

Figure 6:
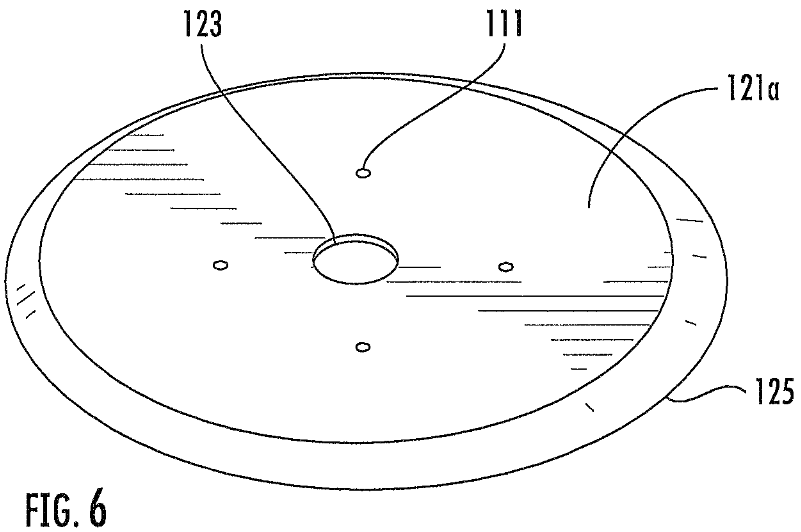
FIG. 6 is a perspective view of the divider from the warning light assembly of FIG. 5.

Referring now also to FIG. 6 in the drawings, a perspective view of a divider 121 from warning light assembly 103 according to the preferred embodiment of the present application is depicted. Each divider 121*a* and 121*b* within warning light assembly 103 is comprised of an electrical slot 123 and an angled lip 125 and are used to separate the different colored lights within light assembly 103 into different internal layers. In the preferred embodiment, dividers 121*a* and 121*b* are typically flat circular sections of material, however, alternative embodiments may also exist where dividers 121*a* and 121*b* are square, hexagonal, or any other shape so long as there is a large enough surface to receive the other components of warning light assembly 103. As shown in FIG. 5, warning light assembly 103 is preferably comprised of two dividers 121*a* and 121*b* and an end cap 135 with lens 127 secured between dividers 121*a* and 121*b* and between divider 121*b* and end cap 135 creating two internal layers within warning light assembly 103. However, alternative embodiments may also exist where warning light assembly 103 may be comprised of more than two or less than two dividers 121.

To connect dividers 121*a* and 121*b* together and form warning light assembly 103, dividers 121*a* and 121*b* have a series of apertures 111 bored through the surface of dividers 121*a* and 121*b* which are sized and positioned to match the size and positioning of apertures 111 bored through mount base 119. Once the apertures 111 within mount base 119 and dividers 121*a* and 121*b* are aligned, fasteners 147 can be inserted through apertures 111 securing warning light assembly 103 onto base 119 along with connecting dividers 121*a* and 121*b* together. Along with having apertures 111 bored through the surface of dividers 121*a* and 121*b*, each divider 121 further has electronic slot 123 bored through the center of dividers 121*a* and 121*b* for receiving the electrical components from post assembly 101. Electronic slot 123 is preferably circular in shape and allows the electrical components within post assembly 101 be pulled up through dividers 121*a* and 121*b* to provide power to and interconnect the components of warning light assembly 103. Alternative embodiments may also exist where electronic slot 123 may be square, hexagonal or any other shape when disposed through dividers 121*a* and 121*b*, so long as the electrical components can be pulled through slot 123.

While the surface of dividers 121*a* and 121*b* are preferably flat, the external edge of dividers 121*a* and 121*b* is preferably angled down to form angled lip 125. As previously shown in the drawings, lens 127 does not have the same external radius as dividers 121*a* and 121*b* and when lens 127 is secured between dividers 121*a* and 121*b*, there is a length of material between the external circumference of lens 127 and the external circumference of dividers 121*a* and 121*b* that is uncovered. If the length between the external circumference of lens 127 and the external circumference of dividers 121*a* and 121*b* was planar, then liquid would be able to pool and potentially seep underneath lens 127 and damage the internal electronics of accident warning light 100. As such, the length of dividers 121*a* and 121*b* beyond lens 127 is angled downward to form angled lip 125 which prevents water or other liquids from building up and potentially seeping underneath lens 127 to damage the electronics within. While angled lip 125 is shown with a slight incline in the present application, alternative embodiments may also exist where lip 125 instead extends at a sharper downward incline. Alternative embodiments may also exist where the length of angled lip 125 may be shorter or longer depending upon the external circumference of lens 127 used in warning light assembly 103.

Figure 7:
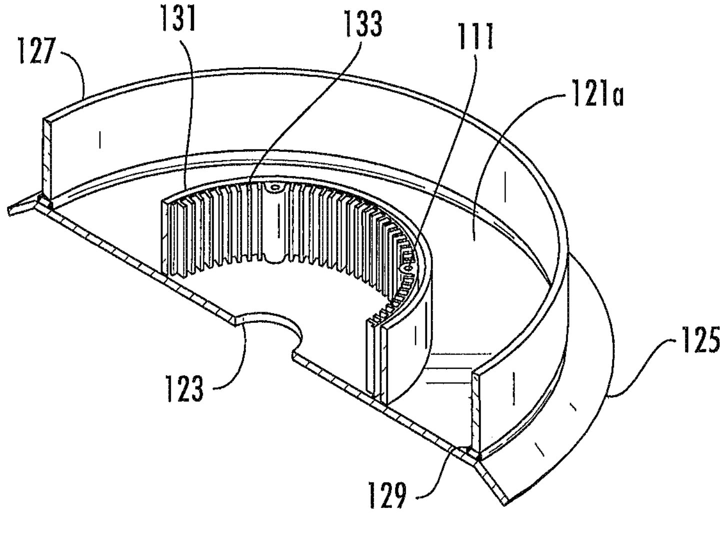
FIG. 7 is a perspective view of a section of the warning light assembly of FIG. 5.

Referring now also to FIG. 7 in the drawings, a perspective view of an internal layer of warning light assembly 103 according to the preferred embodiment of the present application is depicted. Warning light assembly 103 preferably has two internal layers formed between dividers 121*a* and 121*b* with each layer housing a lens 127, O-rings 129, LED panels 131, and heat sinks 133 used when accident warning light 100 is activated. As shown in the drawings, lens 127 are preferably cylindrical sections of material positioned between dividers 121*a* and 121*b* and are used to cover the electrical components within warning light assembly 103. In the preferred embodiment, lens 127 are formed out of a sturdy plastic that is strong enough to withstand the forces of nature, but which are still transparent to let light from LED panels 131 shine through. However, it is also appreciated that alternative embodiments may also exist where lens 127 are instead formed from glass or any other transparent material, so long as the material is capable of withstanding the forces of nature without breaking. Preferably, the material used for lens 127 is a clear material, such that only the color of LED panels 131 will shine from warning light assembly 103. However, alternative embodiments may also exist where colored lens 127 may be used to adjust the colors shining from LED panels 131. In the preferred embodiment, lens 127 are secured within warning light assembly 103 through the pressure of dividers 121*a* and 121*b* pressing against lens 127 when fasteners 147 are used to connect light assembly 103 to post assembly 101. However, it is also appreciated that alternative embodiments may also exist where additional fasteners or adhesives may be used to secure lens 127 between dividers 121*a* and 121*b*. When securing lens 127 in place between dividers 121*a* and 121*b*, O-rings 129 are used to seal the space between lens 127 and dividers 121*a* and 121*b* and top cap 135. O-rings 129 are preferably formed from a gasket material and are used to prevent any liquid from seeping underneath lens 127 to damage the internal electronics.

Along with having lens 127 positioned between dividers 121*a* and 121*b*, warning light assembly 103 further has LED panels 131 and heat sinks 133 secured between dividers 121*a* and 121*b* and end cap 135. As shown, LED panels 131 are typically two arched shaped light panels positioned behind lens 127 and are connected to the electrical components within post assembly 101 to receive power and activation signals from sensor 145. In the preferred embodiment, LED panels 131 may either give off green or red light depending on which layer of warning light assembly 103 panels 131 are positioned. LED panels 131 positioned between dividers 121*a* and 121*b* preferably shine with a red light while panels 131 positioned between divider 121*b* and end cap 135 preferably shine with a green light. However, the colored light given off by each LED panel 131 may vary with the position of the red and green lights being interchangeable or panels 131 may shine with colors other than red or green. Connected to the back of each LED panel 131, either through adhesives or other fastening methods, are heatsinks 133. Using electricity to power LED panels 131 generates heat which could damage the electrical components within warning light assembly 103 if the heat is not properly vented. Heat sinks 133 have a series of fins protruding outwardly from LED panels 131 towards electrical slot 123 to increase the surface area that is exposed to the air and increase the heat exchange within warning light assembly 103 so that LED panels 131 do not overheat. Heat sinks 133 further have apertures 111 extending through the full height of sinks 133 which are sized and positioned to receive fasteners 147 connecting dividers 121*a* and 121*b* and end cap 135 together, such that fasteners 147 also secure LED panels 131 and heatsinks 133 in place within warning light assembly 103.

Figure 8:
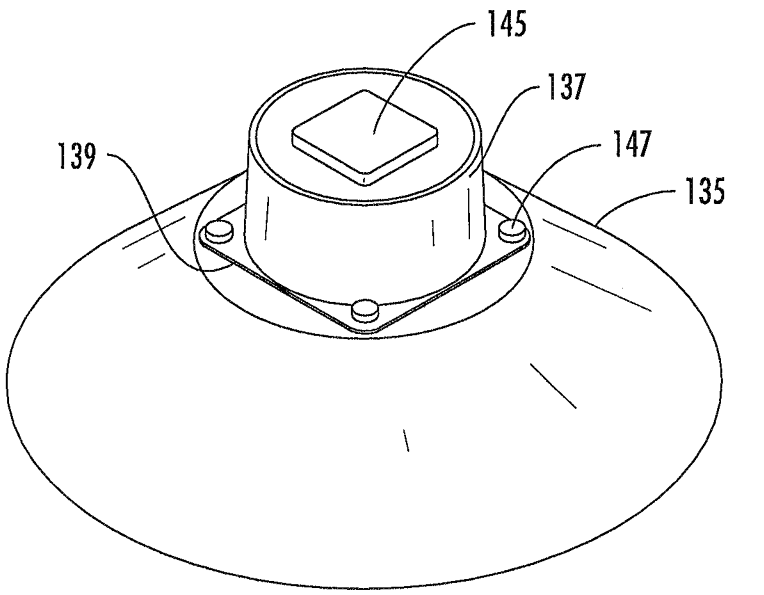
FIG. 8 is a perspective view of the top cap from the warning light assembly of FIG. 5.

Referring now also to FIG. 8 in the drawings, a perspective view of end cap 135 of warning light assembly 103 according to the preferred embodiment of the present application is depicted. End cap 135 has similar components as dividers 121*a* and 121*b* having an electrical slot 123 bored through the center and a series of apertures 111 positioned around electrical slot 123 to match apertures in dividers 121*a* and 121*b* to receive fasteners 145 when forming warning light assembly 103. Where end cap 135 differs from dividers 121*a* and 121*b* is that instead of end cap 135 having an angled lip 125 around the external circumference, the thickness of end cap 135 is instead variable with the thickness of end cap 135 increasing towards the center of end cap 135. As such, the bottom surface of end cap 135 is preferably planar while the height of end cap 135 steadily increases towards the center of end cap 135 until leveling out, such that end cap 135 is shaped as a flat top cone with a planar top for receiving strobe lens 137. This increase in thickness creates a long, slanted portion along the circumference of end cap 135 instead of using an angled lip 125 to prevent liquid from pooling on end cap 135. As shown in the drawings, strobe lens 137 has a smaller external radius than lens 127 and if an angled lip 125 was used for end cap 135, water and other liquids would still be able to pool on top of end cap 135. The sloped surface prevents that as the top surface of end cap 135 is sized to fit strobe lens 137 with the rest of the surface being slopped to prevent liquid build up.

Figure 9:
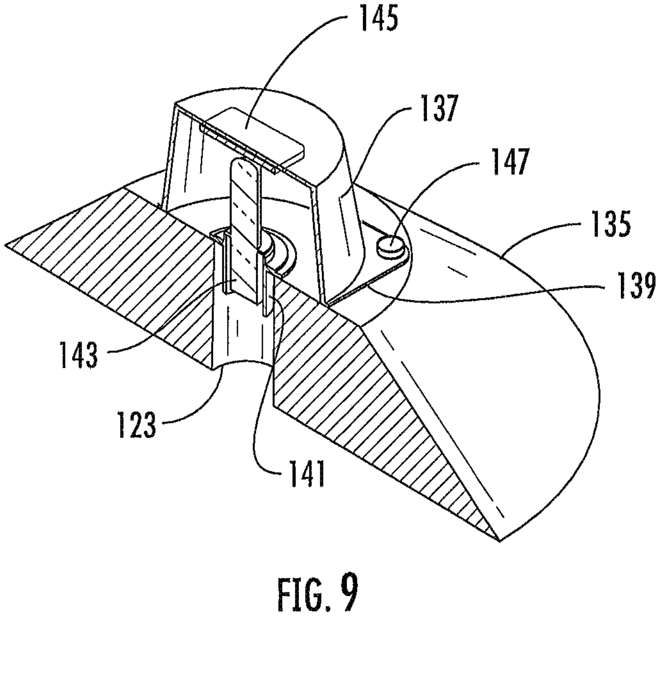
FIG. 9 is a perspective view of a section of the warning light assembly of FIG. 5.

Referring now also to FIG. 9 in the drawings, a perspective view of a section of warning light assembly 103 according to the preferred embodiment of the present application is depicted. Along with having lens 127 positioned between dividers 121*a* and 121*b* and between divider 121*b* and end cap 135, warning light assembly 103 further has strobe lens 137 positioned on the top of end cap 135 which is used to house strobe bulb 143 and sensor 145. Strobe lens 137 is preferably formed out of the same materials as lens 127 but instead of being a cylindrical lens without a top or bottom surface, strobe lens 137 is closed on top and has lens base 139 extending outwardly along the external circumference of lens 137. As shown in the drawings, lens base 139 is preferably square in shape and extends outwardly from the edges of strobe lens 137 over end cap 135 to increase the surface area in contact between lens 137 and end cap 135. It is also appreciated that alternative embodiments may also exist where instead of lens base 139 being square, base 139 may be circular, hexagonal, or any other shape so long as base 139 has sufficient surface area in contact with end cap 135. To secure strobe lens 137 onto end cap 135, lens base 139 has a series of apertures 111 bored through base 139 that are sized and positioned to match apertures 111 in end cap 135, such that fasteners 147 used to secure dividers 121*a* and 121*b* and end cap 135 together will also secure lens base 139 to end cap 135.

When strobe lens 137 is secured to end cap 135, electronic slot 123 is preferably centered within lens 137 and is used to receive strobe socket 141 and strobe bulb 143. Strobe socket 141 is selectively sized to be secured within electronic slot 123 and functions as a conduit to connect to the electrical components within warning light assembly 103 when positioned within slot 123. Once strobe socket 141 is in place within electronic slot 123, strobe bulb 143 can be secured within socket 141 to receive power and any activation signals from the internal electrical components. Strobe bulb 143 is preferably an upright light bulb designed to pulse with light when powered on to alert passing drivers of upcoming adverse road conditions. In the preferred embodiment, strobe bulb 143 is an amber bulb which pulses with a yellow light when activated, however, alternative embodiments may also exist where instead of being an amber bulb, strobe bulb 143 may be any other color of light. It is further appreciated that while strobe bulb 143 is described as a pulsing light while activated, alternative embodiments may also exist where instead of strobe bulb 143 flashing with light, strobe bulb 143 may instead shines with a consistent light.

Along with having strobe bulb 143 positioned within strobe lens 137, warning light assembly 103 further has sensor 145 positioned within lens 137 and connected to the internal electrical components. While sensor 145 is shown to be secured within strobe lens 137 in the present application, alternative embodiments may also exist where sensor 145 may instead be secured onto an external surface of accident warning light 100, such as beneath divider 121*a*, on support post 105, or any other surface of warning light 100 so long as sensor 145 maintains connection with the internal electronics and the roadway is still visible. In the preferred embodiment, sensor 145 is a visual sensor designed to monitor the flow of traffic and detect any accidents or adverse driving conditions on the roadway. When monitoring for an accident, an accident may be detected when sensor 145 visually confirms that cars are significantly out of the designated road lanes, when cars have impacted with other cars or surfaces, or any other visual indication that a car accident has occurred. Along with visual monitoring, sensor 145 may further include audio sensors to help determine if an accident has occurred through monitoring for any loud sounds typically associated with car crashes such as tires screeching, impact sounds, or any other sound which may indicate an accident. It is also appreciated that sensor 145 may further incorporate an infrared sensor that automatically turns on when visibility is limited such as with fog or heavy rain. Whenever sensors 145 detect an accident or where visibility is limited, sensors 145 generate and send signals through the electrical components in accident warning light 100 to activate the lights within warning light assembly 103 along with sending signals to a central server to activate other warning lights 100. It is further appreciated that while a singular sensor 145 is shown in the present application, alternative embodiments may also exist where warning light assembly 103 may have more than one sensor 145.

During operation, sensor 145 continuously monitors a section of the roadway to detect any accidents or adverse driving conditions that might be present. Once an accident or adverse driving condition is detected, sensor 145 generates and sends signal through the internal electronics to begin providing power to strobe bulb 143 such that bulb 143 will start indicating to drivers to begin slowing down. Along with generating a signal to activate strobe bulb 143, additional signals may be generated and sent to the central network connecting accident warning lights 100 together. The central network may then further relay these signals to emergency services and to accident warning lights 100 positioned earlier along the road. Depending on the size and seriousness of the accident, additional signals may be generated either at accident warning light 100 or the central network, to activate the red LED panels 131 to signal to the drivers to stop driving. Stopping traffic would allow for emergency services to access any of the drivers caught in the accident and begin emergency treatment or rescue operations without having to worry about directing traffic. Once the accident has been cleared away, a signal can then be generated to activate the green LED panels 131 to signal to drivers that the roads are clear and that it is safe to begin driving again.

While not shown in the drawings, it is also appreciated that alternative embodiments may also exist where accident warning lights 100 may be further connected to an external roadway sign to help direct traffic. Roadway signs are typically temporary signs used by emergency services or construction crews to alert oncoming traffic about any adverse conditions in the roads ahead. Digital signs are typically used for these roadway signs allowing for various messages to be displayed and adjusted as needed. In this alternative embodiment, accident warning light 100 is connected to the roadway sign and whenever warning light 100 is activated, a signal can be generated and sent to the roadway sign to display a preprogrammed message. These messages may preferably be personalized depending on the color light that is turned on or the distance from the accident warning light 100 that is activated. For example, if strobe bulb 143 is activated, a message directing drivers to begin slowing down could be programmed to appear on the roadway sign while if the red LED panels 131 are activated, a message directing traffic to stop may be displayed instead. These messages may be adjusted and updated in real time either directly at the roadway sign or through the central server connected to accident warning lights 100.

It is apparent that an assembly with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An accident warning light, comprising:
a post assembly, comprising:
a post base;
a support post extending outwardly from the post base; and
a post mount coupled the support post; and
a warning light assembly, comprising:
a top cap;
an electrical slot disposed through the top cap;
at least one aperture disposed through the top cap, the at least one aperture being configured to receive a fastener to secure the top cap onto the post mount;
a strobe socket selectively sized to be retained within the electrical slot;
a strobe bulb conductively coupled to the strobe socket;
a strobe lens connected to a top surface of the top cap, the strobe lens being configured to cover the strobe bulb; and
at least one sensor for monitoring a roadway, the at least one sensor being conductively coupled to the strobe bulb, such that the at least one sensor activates the strobe bulb when an accident or any other adverse condition is detected.

2. The accident warning light according to claim 1, wherein the post assembly further comprises:
at least one aperture disposed through the post base, the at least one aperture being configured to receive a fastener to secure the post base to a designated surface.

3. The accident warning light according to claim 1, wherein the support post extends outwardly from the post base at a ninety-degree angle relative to the post base.

4. The accident warning light according to claim 1, wherein the support post extends outwardly from the post base at an acute angle relative to the post base.

5. The accident warning light according to claim 1, wherein the post assembly further comprises:
an access panel connected to an external surface of the support post, the access panel being conductively coupled to the strobe bulb, such that the access panel can be used to manually activate or deactivate the strobe bulb.

6. The accident warning light according to claim 1, wherein the post mount comprises:
a mount insert selectively sized to be received within a top opening of the support post;
a mount base extending outwardly along a top edge of the mount insert, the mount base being configured to receive the warning light assembly; and
at least one aperture disposed through the mount base, the at least one aperture being configured to receive a fastener to secure the warning light assembly onto the mount base.

7. The accident warning light according to claim 1, wherein the thickness of the top cap is variable, such that the thickness of the top cap increases towards a center of the top cap until leveling out creating a planar top surface.

8. The accident warning light according to claim 1, wherein the warning light assembly further comprises:
a divider;
an electrical slot disposed through the divider;
an angled lip disposed along an outer edge of the divider, the angled lip being oriented at a downward angle; and
at least one aperture disposed through the at least one divider, the at least one aperture being configured to receive a fastener to secure the divider to the top cap.

9. The accident warning light according to claim 8, wherein the warning light assembly further comprises:
at least one LED panel disposed between the top cap and the divider, the at least one LED panel being conductively coupled to the sensor, such that the at least one sensor activates the at least one LED panel when an accident or any other adverse condition is detected.

10. The accident warning light according to claim 9, wherein the warning light assembly further comprises:

a lens disposed between the top cap and the divider, the lens being configured to protect the at least one LED panel.

11. The accident warning light according to claim 1, wherein the warning light assembly further comprises:

at least one additional divider;

an electrical slot disposed through the at least one additional divider;

an angled lip disposed along an outer edge of the at least one additional divider, the angled lip being oriented at a downward angle; and at least one aperture disposed through the at least one additional divider, the at least one aperture being configured to receive a fastener to secure the at least one additional divider to the divider.

12. The accident warning light according to claim 11, wherein the warning light assembly further comprises:

at least one LED panel disposed between the divider and the least one additional divider, the at least one LED panel being conductively coupled to the sensor, such that the at least one sensor activates the at least one LED panel when an accident or any other adverse condition is detected.

13. The accident warning light according to claim 12, wherein the warning light assembly further comprises:

a lens disposed between the divider and the at least one additional divider, the lens being configured to protect the at least one LED panel.

14. The accident warning light according to claim 1, further comprising:

a central server for connecting the accident warning light to at least one additional accident warning light.

15. The accident warning light according to claim 14, wherein activation of one accident warning light sends a signal through the central server to activate the at least one additional accident warning light.

16. The accident warning light of claim 14, wherein activation of the accident warning light sends a signal over the central server to emergency services.

17. The accident warning light of claim 1, wherein the at least one sensor is an audio sensor.

18. The accident warning light of claim 1, wherein the at least one sensor is a visual sensor.

19. The accident warning light of claim 1, wherein the at least one sensor is an infrared sensor.

* * * * *